United States Patent [19]

Matzner

[11] Patent Number: 5,164,150
[45] Date of Patent: Nov. 17, 1992

[54] METHOD AND APPARATUS FOR REDUCING PARASITIC BYPASS FLOW IN A BOILING WATER REACTOR

[75] Inventor: Bruce Matzner, San Jose, Calif.

[73] Assignee: General Electric Company, San Jose, Calif.

[21] Appl. No.: 785,835

[22] Filed: Oct. 21, 1991

[51] Int. Cl.⁵ .............................................. G21C 15/00
[52] U.S. Cl. .................................... 376/210; 376/373
[58] Field of Search ............... 376/210, 373, 374, 375

[56] References Cited

U.S. PATENT DOCUMENTS 5,023,047 6/1991 Nishida et al. ...................... 376/210

Primary Examiner—Brooks H. Hunt
Assistant Examiner—Frederick H. Voss
Attorney, Agent, or Firm—Robert R. Schroeder

[57] ABSTRACT

A method and apparatus for improving the operating efficiency of a boiling water reactor is disclosed. Instead of coolant water being injected simultaneously at the bottom of the fuel rod assemblies and core bypass regions, the two flows then proceeding in parallel to the top of the reactor, the top of the bypass regions is sealed off and bypass coolant water is directed at the bottom of the sealing cover. This forces the bypass coolant water to flow down through the bypass regions. At the bottom of the bypass regions, provision is made to allow the bypass water to flow into the bottom of the fuel rod assemblies where it is entrained by the fuel rod coolant water flow. By converting flow through the core bypass region into a single series flow, increased operating efficiency is achieved.

6 Claims, 3 Drawing Sheets

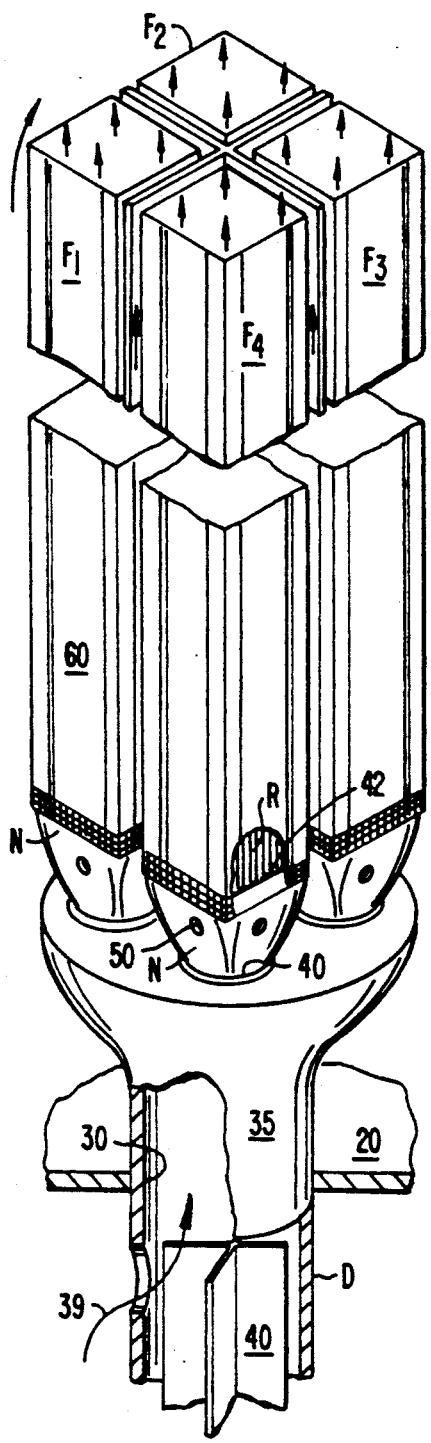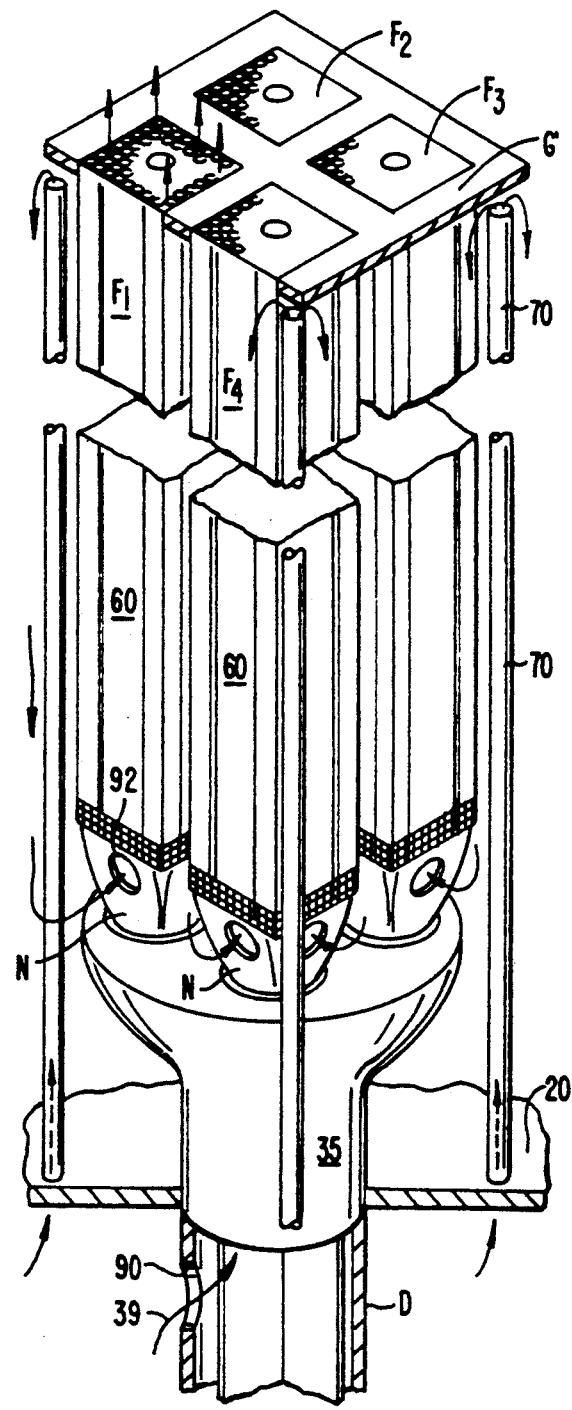

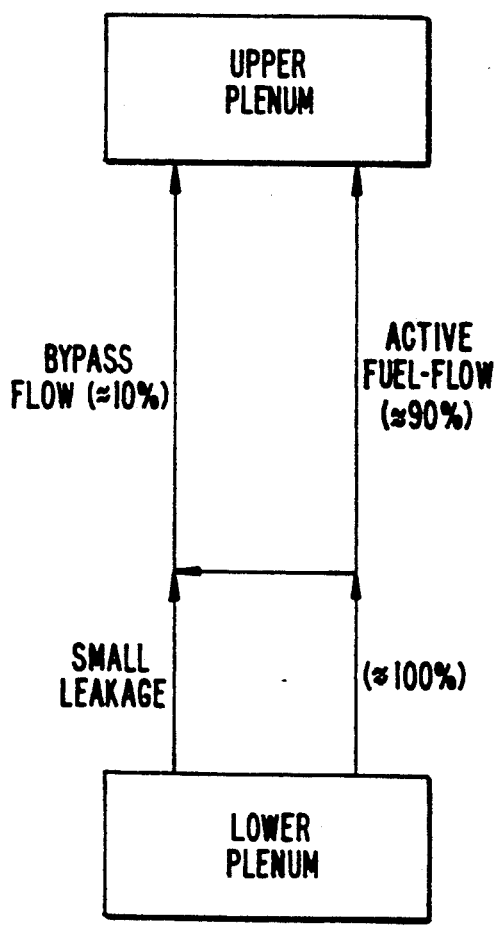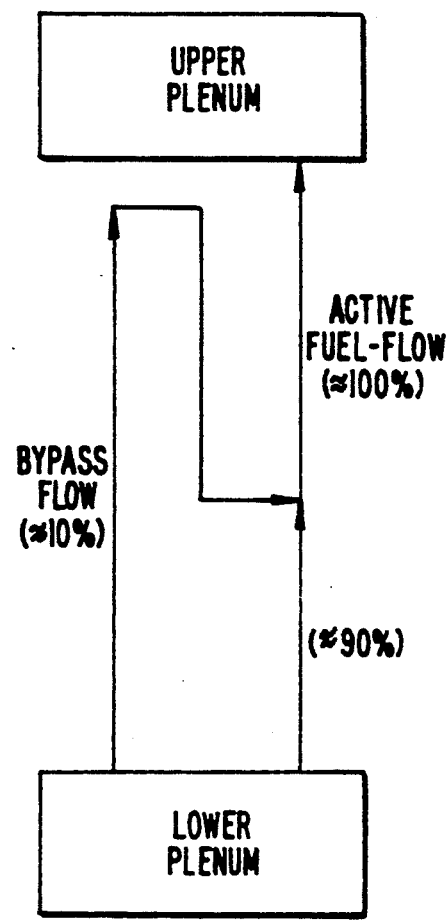
FIG. 5A.
(PRIOR ART)
FIG. 5B.

METHOD AND APPARATUS FOR REDUCING PARASITIC BYPASS FLOW IN A BOILING WATER REACTOR

This invention relates to boiling water nuclear reactors. In particular, it relates to improving the efficiency of a boiling water reactor ("BWR") by placing the flow of water through the so-called "core by-pass region" in series with the steam generating flow of the water through the fuel bundles.

BACKGROUND OF THE INVENTION

Using nuclear fission to generate electricity in boiling water reactors is known. Fissionable fuel is loaded into sealed fuel rods, which are in turn assembled into square arrays called fuel rod assemblies. The fuel rod assemblies include a lower tie plate for supporting the fuel rods and permitting the entry of water, an upper tie plate for fastening to at least some of the fuel rods and permitting the exit of water and generated steam, and a channel surrounding the lower tie plate, upper tie plate and fuel rods therebetween. The channel has the function confining the flow path between the tie plates and around the fuel rods. It is also the member that sets apart the steam generating flow path from the interior of the fuel bundles from the surrounding core bypass region.

In a BWR, water flows upward through the reactor core. As the water travels upward, it is heated and a part of it is converted to steam. The steam is used to drive a turbine and then cooled, recondensed and recirculated through the core. At the top of the core, $\approx 15\%$ of the coolant by weight has been converted to steam, but the steam's volume is 70 to 80% of the total coolant volume.

In addition to cooling the reactor, water also moderates the fission reaction. Typically, the fission reaction produces fast neutrons. The chain nuclear reaction can only be continued by slow or thermal neutrons. The fast neutrons are slowed or "thermalized" by passage through the water coolant.

When coolant boils within a boiling water nuclear reactor, the neutron moderating water becomes less dense or has a high "void fraction." This high void fraction causes the moderation of the neutrons to occur more slowly.

To assure that a sufficient amount of water is present in the boiling water reactors for slowing neutrons, such reactors circulate a portion of the cooling water into so-called "bypass regions" which surround the fuel assemblies. The water which flows through these regions is not heated sufficiently to be converted to steam and therefore continues to act as a dense moderator (in the liquid state) for the fission reaction.

The configuration and purpose of the bypass region can be easily understood.

The so-called "core bypass region" is defined outside of the fuel bundles in the interstitial volume between the fuel channels. This region is not for the generation of steam. Consequently, the core bypass region—unlike the volume interior of the fuel bundles—is filled with liquid moderator only; steam is not generated in this location.

When water is admitted to the lower tie plate through a nozzle and connected plenum at the bottom of each fuel bundle, some water is bypassed through small nozzles to the core bypass region. Water also flows to the core bypass region through many so-called "leakage" paths. Water flow through the core bypass region does not contact the heat generating fuel rods. Speed of water flow through the core bypass region is designed to be fast enough to avoid generation of steam and maintain the presence of liquid moderator.

It is important to note that the flow of water through the core bypass region is in parallel with the flow of the coolant within the fuel bundles.

The water which remains in and flows through the core bypass does help moderate the nuclear reaction. Unfortunately, the water in the core bypass region adds nothing to the steam generation capability of the reactor. In fact, although the presence of liquid water is needed in the bypass regions is needed for neutron moderation, the energy required to pump the water through the core bypass region is otherwise wasted. It does not contribute to the steam generation and hence the energy output of the reactor.

SUMMARY OF THE INVENTION

A method and apparatus is disclosed for altering the flow of water through the bypass region of a boiling water reactor. Instead of the coolant flow through the core bypass region being in parallel with flow through the central steam generating core, a serial flow stream is utilized through the core bypass region. This serial flow stream through the core bypass region first runs in the liquid state only through the core bypass region of the reactor to provide the required nuclear moderation. Thereafter, the core bypass region discharges to the inlet core and then through the central channels of the fuel bundle. In this region, the discharge from the core bypass region is conventionally utilized for steam generation. Thus the flow utilized for the core bypass region is also utilized in the steam generating flow path through the fuel bundles of the reactor.

The apparatus of this invention includes a closure at the top of the core bypass region to prevent the water being discharged from the core bypass region from joining the water and steam discharge from the fuel bundles. Water is introduced to the core bypass region at the top of the closed core bypass. Thereafter, water within the core bypass region flows downward and is discharged directly to the coolant entering interior of the fuel bundles for generation of steam within the reactor core.

Preferably, vertical conduits in the core bypass region communicate liquid coolant across and through the core plate to the top of the closed core bypass region. Thereafter, water interior of the core bypass region flows downward, effectively counter flowing the upwardly moving water and steam in the interior of the fuel bundles. Thereafter, flow within the fuel bundles is conventional; it flows from the bottom of the fuel bundles to the top of the fuel bundles.

The resulting method of water flow is more thermal hydraulically efficient. Specifically, pumping energy can either be reduced about 10% or about 10% more flow can be utilized through the core with the same energy expenditure. Further, since the downward passage of the water through the core bypass region occurs in counter flow heat exchanger with respect to the conventional upward steam generating flow in the core, preheating of the water in the core bypass region occurs. This results in the addition of heat or preheating of the water in the core bypass region.

The present invention will now be described in detail, with reference to the figures listed and described below.

BRIEF DESCRIPTION OF THE DRAWINGS

FIG. 2 is a perspective section of the prior art flow path of a boiling water reactor emphasizing the parallel flow of water through the fuel bundles and core bypass region; and, FIG. 3 is a side elevation section illustrating the improved core bypass flow illustrating a sealed upper core bypass region with flow commencing at the upper portion of the core bypass region and counter flowing steam within the core for discharge from the core bypass region to steam generating paths within the core;

FIG. 4 is a perspective section of the flow path of a boiling water reactor illustrating the series core flow of water within the core bypass region of the reactor; and, FIGS. 5A and 5B are a simple line schematics comparing the prior art and present disclosure flow paths.

DESCRIPTION OF THE SPECIFIC EMBODIMENT

Figure 1:
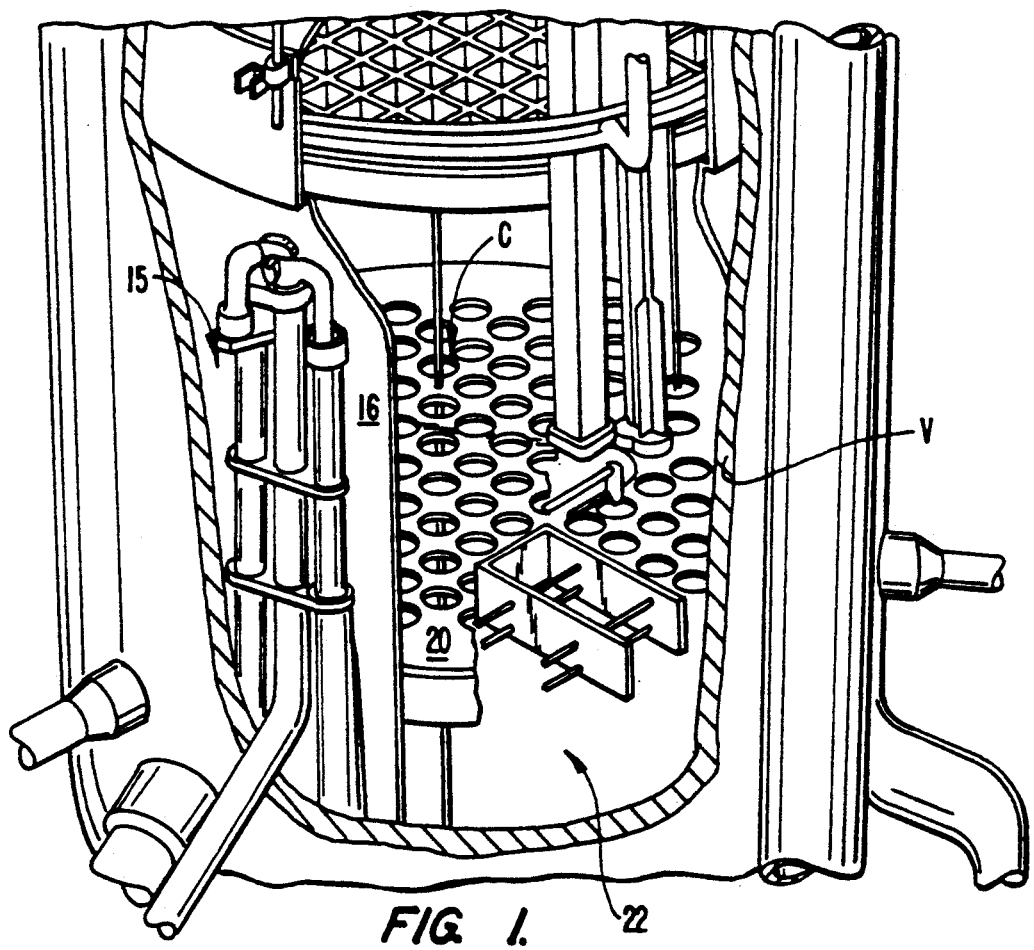
FIG. 1 is a perspective side elevation section of a boiling water reactor.

Referring to FIG. 1, the steam generating core region C of a boiling water nuclear reactor is illustrated. A reactor vessel V is shown broken away. A first outer and concentric down flowing region 15 of the reactor is shown about a cylindrical shroud 16 enclosing the central steam generating core C. So that the steam generating path upwardly within the core C can be seen and understood, the shroud 16 is also shown in section.

Extending across the shroud and providing a barrier from a lower plenum 22 underneath the core C and across the shroud there is a core separation plate 20. Core separation plate serves as a fluid flow barrier between lower plenum 22 and both the steam generation path and core bypass region of the reactor.

So that the conventional steam generation path and the core bypass region flow paths can be conventionally understood, the perspective of FIG. 2 is set forth.

Referring to FIG. 2, a section of the boiling water reactor is shown interior of the shroud (not shown). A control rod drive housing D is shown penetrating core separation plate 20 at an aperture 30. A specialized fitting called a core support casting 35 rests on the top of the control rod drive housing D and supports four fuel bundles F.

The reader will understand that it is not the function of this invention to set forth the entire structure of the boiling water nuclear reactor. It will be understood that control rod drive housing D contains the control rod 40, provides the fluid flow path 39 for liquid moderator passing into the interior of the core support casting 35 to supply the four supported fuel bundles F1-F4, and at the same time supports the weight of the four fuel bundles.

Each of the fuel bundles F1-F4 rests at a nozzle N interior of an aperture 40 in the core support casting. Nozzle N then communicates to a lower tie plate 42 interior of the fuel bundles. Lower tie plate 42 supports the fuel rods R and permits the entry of coolant from the core support casting 35. Once water has entered into the fuel bundles interior of channels 60, water flows upwardly moderating the neutron flux and generating steam.

The upper end of the fuel bundles are supported vertically at a top guide G. Thus, the fuel bundles F1-F4 are maintained vertically upright.

Having set forth this much, the convention prior art flow path can be set forth with respect to FIG. 2. Specifically, nozzle N is provided with lower tie plate bypass holes 50. Water interior of the nozzle N bleeds through these holes into the core bypass region exterior of channels 60. The water in the core bypass region exterior of the fuel bundles flows upwardly—parallel to the water flow in the interior of the fuel bundles. Flow occurs from the bottom of the fuel bundles F1-F4 to the top of the fuel bundles F1-F4, the flow being on the exterior of the channels 60. Exit of the water occurs through and around the top guide G on the exterior of the channels 60.

Those having skill in boiling water nuclear reactor will realize that the illustrated flow path to the core bypass region is not exclusive. Other flow paths of moderator are present. Examples of such flow paths can include leakage from the bottom of the fuel bundles F1-F4, leakage across the core separation plate 20, leakage at the apertures for penetration of the control rods into the core bypass region and the like. It is only necessary that the reader understand that all of these flow paths have the same result—parallel flow in the core bypass region to the steam generating flow path interior of the channels 60 of fuel bundles F1-F4.

Figure 3:
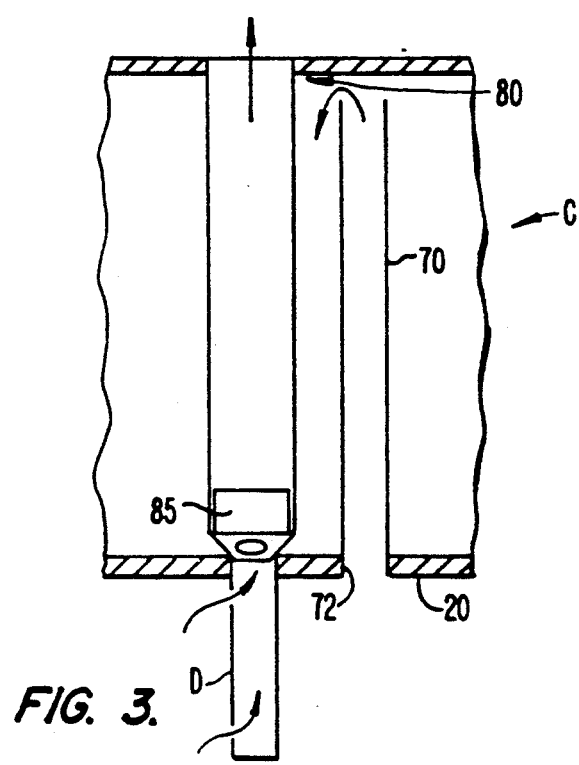

Having set forth the prior art, the flow path of this invention may now be set forth with respect to the schematic of FIG. 3 and the perspective of FIG. 4.

Referring to the schematic of FIG. 3, a side elevation section of a reactor core C is illustrated. As before the main entry of water is along path 39 into control rod drive housing D into core support casting 35 and then into a conventional steam generating path interior of the channels 60.

Unlike the schematic of FIG. 2, core separation plate 20 supports a series of conventional vertical conduits 70 communicated through the core separation plate 20. These vertical conduits 70 communicate water from the bottom of the core bypass region to the top of the core bypass region.

The top of the core bypass region is sealed at bypass region seal 80. This seal causes water introduced at the top of the core bypass region to counter flow in the downward direction the upward steam generating path interior of channels 60 of fuel bundles F1-F4.

At the bottom of the core bypass region, water enters the interior of the fuel bundles F1-F4 through apertures 85. Once entry has been made at apertures 85, the remainder of the flow path is conventional and upward through the interior of the fuel bundles F1-F4 interior of channels 60.

The reader will understand that the respective apertures in the nozzle N have been re-sized in accordance with this invention. Specifically, aperture 90 in control rod drive housing D has been dimensioned so that water being discharged from the core bypass region enters nozzle N at apertures 92. Further, top guide G' is illustrated dimensioned to substantially close off the interstitial areas between the respective top edges of channels 60 of fuel bundles F1-F4.

It will be understood that the seals here illustrated are not perfect. For example, the seal at the top guide G' is not absolute. These seals are only maintained to such an extent so as to cause the counter flow path of water in the core bypass region from the top of the core bypass region to the bottom of the core bypass region.

It will likewise be apparent that the illustrated seal at the vicinity of the conventional top guide G can be made in numerous different ways. For example, a flange can be added around the top portion of the channels 60.

I prefer to add vertical conduits 70 to produce the requisite counter flow of the water interior of the core bypass region.

I have referred to the prior art as having the core flow in parallel with the flow through the core bypass region. Referring to FIG. 5A, it can be seen that the flow of coolant through the core bypass region is parallel as presently utilized in the prior art. Referring to FIG. 5B, it will be understood that flow through the core bypass region is in series with that segment of the flow occurring directly to the core. It can be appreciated that the two flow diagrams differ radically, one from another.

What is claimed is:

1. In a boiling water nuclear reactor having
 a pressure vessel for containing a reactor core for the generation of steam;
 a reactor core situated interior of said vessel;
 means for forming a core barrier below said core and generally across said vessel;
 coolant pumping means for pumping coolant through said core barrier from a flow path from the bottom of said core to the top of said core;
 a plurality of the discrete fuel bundles making up said core, said fuel bundles including elongate vertical fuel rods supported between upper and lower tie plates, said bundles being interior of a channel and defining interiorly thereof a first steam generation flow path in the interior of said channels and a core bypass region exterior of said channels;
 first flow path means interior of said fuel bundles through said channel and around said fuel rods;
 second flow path means exterior of said fuel bundles exterior of said channel away from said fuel rods;
 the improvement to said first and second flow paths means comprising in combination:
 means for sealing said core bypass region at the top of said core for providing a confined and sealed core bypass region;
 means for introducing coolant across said core plate into said sealed core bypass region; and,
 means for introducing said coolant from said core bypass region to said fuel bundle whereby said core bypass region is in series flow with coolant entering said fuel bundles.

2. The invention of claim 1 and wherein:
 said means for introducing coolant to said core bypass region includes vertical conduits, said conduits extending from apertures through said core plate upwardly to said means for sealing said core bypass region.

3. The invention of claim 1 and wherein said means for introducing coolant from said core bypass region to said fuel bundle interior of said channel includes means for introducing said coolant into the lower portion of said fuel bundle.

4. In a boiling water nuclear reactor having
 a pressure vessel for containing a reactor core for the generation of steam;
 a reactor core situated interior of said vessel;
 means for forming a core barrier below said core and generally across said vessel;
 coolant pumping means for pumping coolant through said core barrier from a flow path from the bottom of said core to the top of said core;
 a plurality of the discrete fuel bundles making up said core, said fuel bundles including elongate vertical fuel rods supported between upper and lower tie plates, said bundles being interior of a channel and defining interiorly thereof a first steam generation flow path in the interior of said channels and a core bypass region exterior of said channels;
 the process of coolant flow through said reactor comprising in combination:
 sealing said core bypass region at the top of said core for providing a confined and sealed core bypass region;
 introducing coolant across said core plate into said sealed core bypass region; and,
 flowing said coolant from said core bypass region to said fuel bundle interior of said channel whereby said core bypass region is in series flow with coolant entering said fuel bundles.

5. The invention of claim 4 and wherein:
 said introducing coolant to said core bypass region includes the further steps of
 providing vertical conduits, said conduits extending from apertures through said core plate upwardly to said sealed core bypass region; and,
 introducing said coolant to said vertical conduits whereby said fluid flows to said sealed portion of said core bypass region.

6. The invention of claim 4 and wherein said introducing coolant from said core bypass region to said fuel bundle interior of said channel step includes introducing said coolant into the lower portion of said fuel bundle.

* * * * *